Dec. 5, 1944. H. H. PLATT 2,364,096
HELICOPTER
Filed Nov. 23, 1938 4 Sheets-Sheet 3

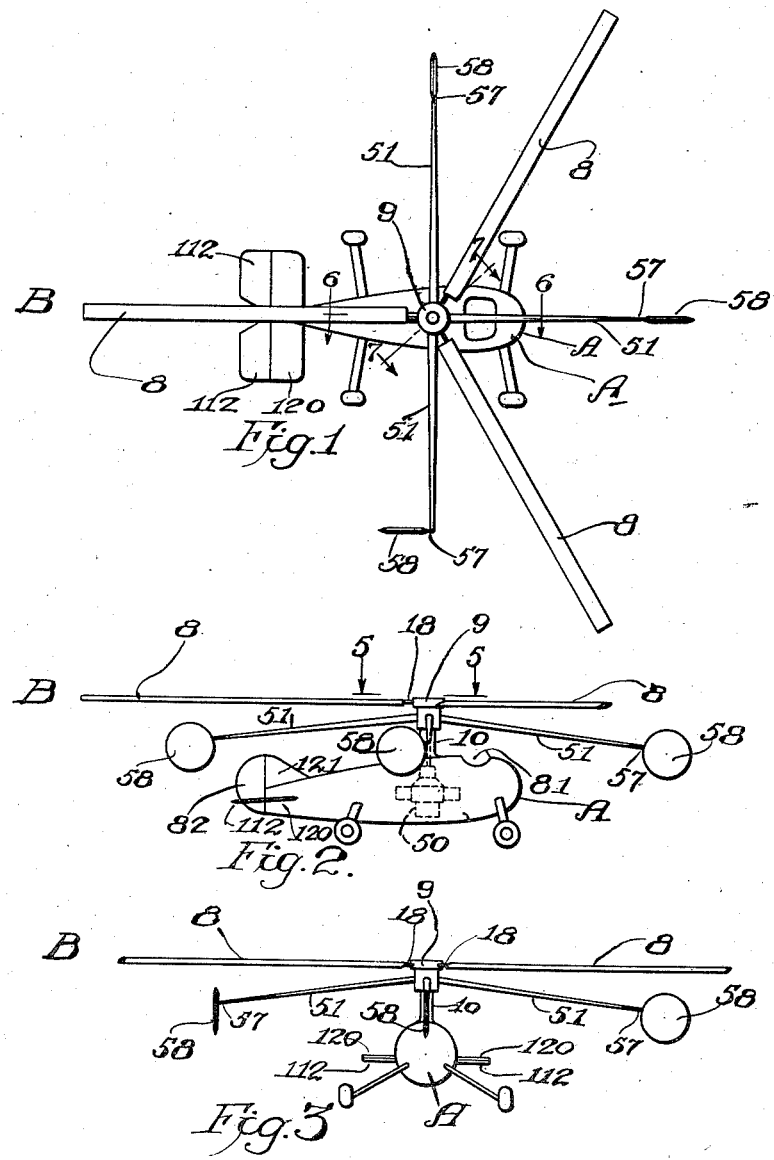

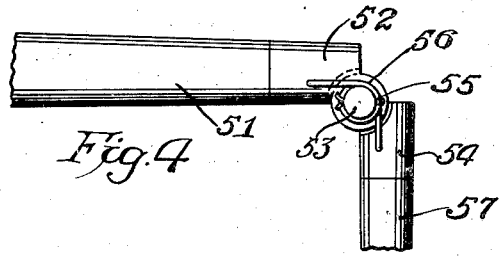
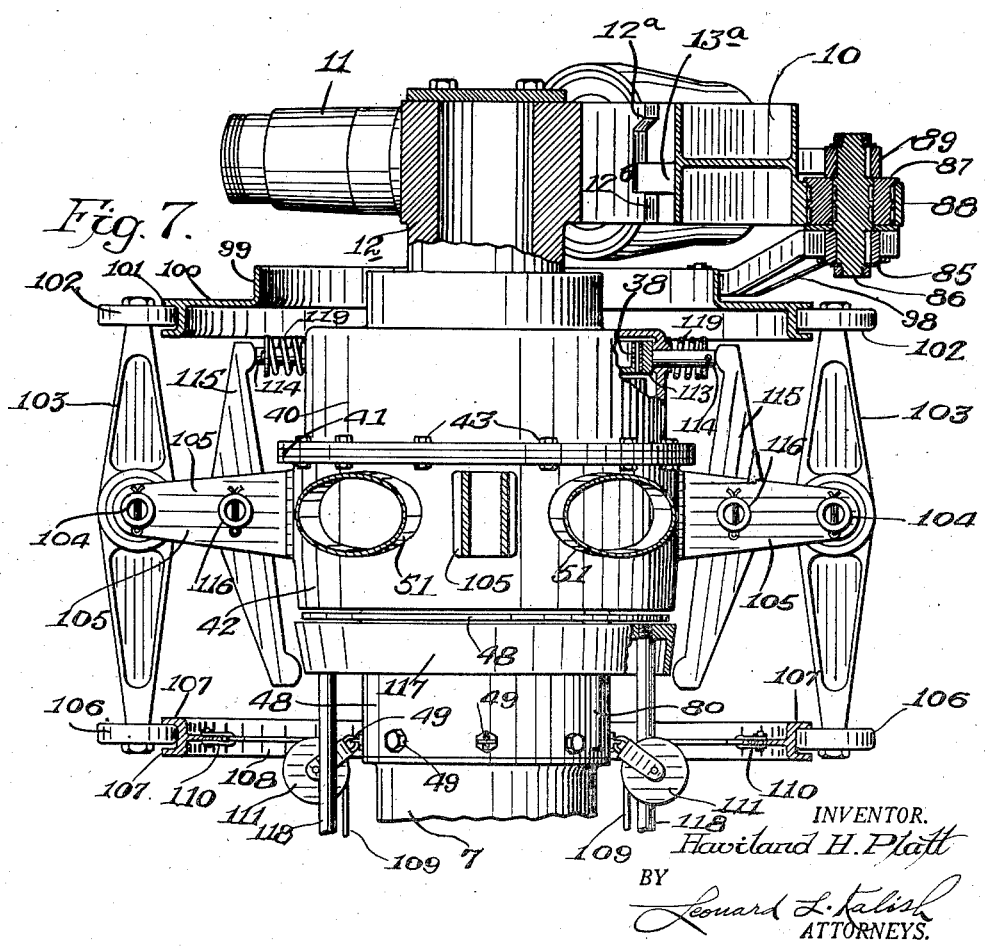

INVENTOR.
Haviland H. Platt
BY
Leonard L. Kalish
ATTORNEYS.

Dec. 5, 1944.　　　H. H. PLATT　　　2,364,096
HELICOPTER
Filed Nov. 23, 1938　　　4 Sheets-Sheet 4
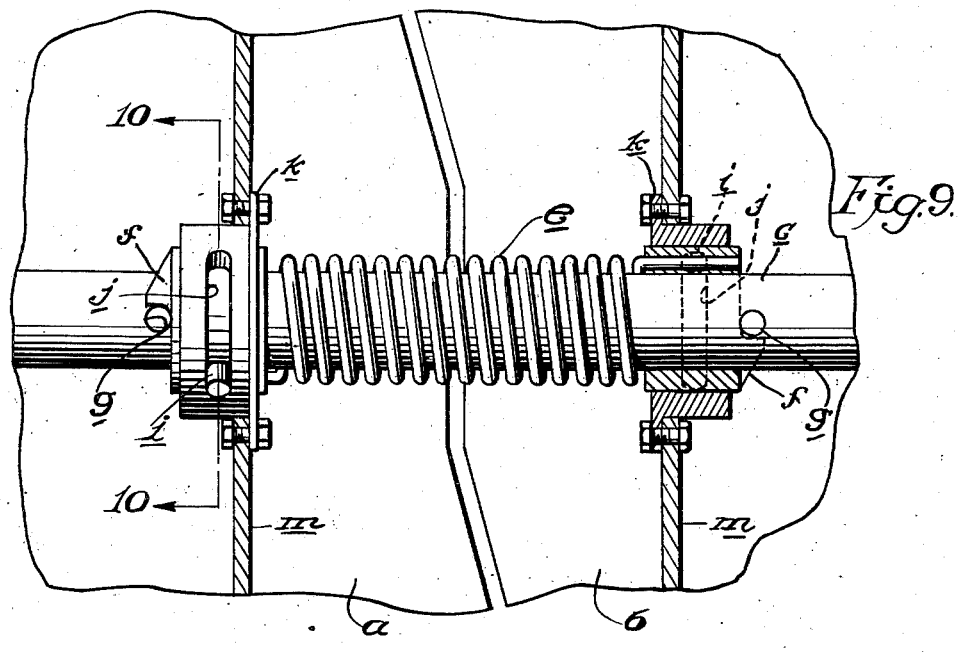
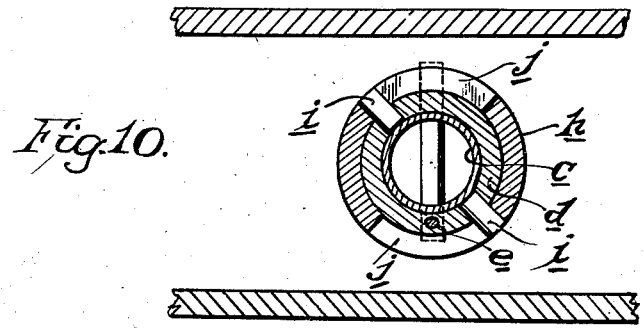
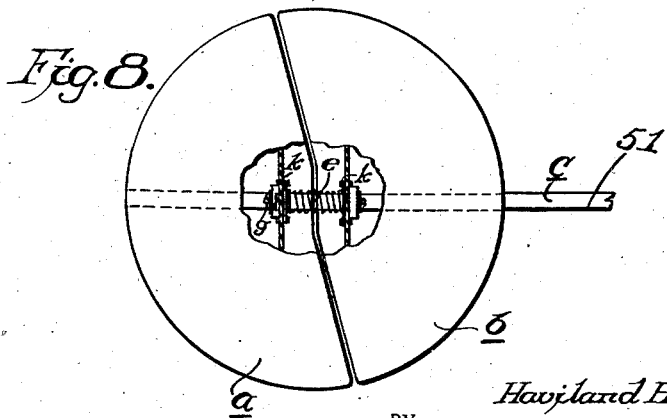
INVENTOR.
Haviland H. Platt
BY Leonard L. Kalish
ATTORNEY.

Patented Dec. 5, 1944

2,364,096

UNITED STATES PATENT OFFICE 2,364,096

HELICOPTER

Haviland H. Platt, New York, N. Y., assignor to Rotary Research Corporation, Philadelphia, Pa., a corporation of Pennsylvania Application November 23, 1938, Serial No. 242,053

22 Claims. (Cl. 244—17)

The present invention relates to the type of aircraft known as the helicopter, and more particularly to that type of helicopter which derives its support from a single rotor or lift screw, the blades of which are articulated to the hub so as to allow freedom to balance the centrifugal, lift and drag forces.

One object of the present invention is to provide novel, simple, practical and light means for neutralizing the torque reaction of the single rotor, thus making available the known high lift characteristics of the single rotor helicopter.

Another object of the present invention is to provide novel means for automatically and manually controlling the rotor pitch to meet the varying requirements of flight, such as hovering, vertical climb, inclined climb, high speed forward flight and power-off landing.

Another object of the present invention is the reduction of the parasite drag of the structure and torque neutralization means so that high speed in forward flight may be attained.

Another object is to provide simple control means which insure complete and easy maneuverability in all phases of flight performance.

With the above and other objects in view, which may appear more fully from the following detailed description, the present invention contemplates a novel principle of torque neutralization, and means therefor, whereby a second, primarily non-lifting (and relatively more rigid) counter-rotor, running in opposite direction to the lift-screw is provided, said counter-rotor being provided with vanes of such drag area that the torque of the liftscrew may be equalled by the drag torque of the counter-rotor.

Novel gearing or other transmission means are also contemplated which so interconnect the lifting rotor and the counter-rotor that the torque of the one is automatically opposed to the torque of the other. The same gearing (or other means) which interconnects the two rotors may also provide the required gear reduction between the engine and the liftscrew hub or between drive shaft and liftscrew.

Optionally the engine may be mounted in rigid relationship to the counter-rotor, in which case it rotates with it, and in which arrangement the fuselage or load carrying structure is totally free of torque; or the engine may be mounted in the said fuselage, in which case it does not rotate and the fuselage is subject to the amount of torque developed by the engine only, which will bear to the total torque the same ratio that the rotor speed does to the engine speed. In contemplated normal practice this may be about one-tenth of the rotor torque, although this ratio may vary.

The form of the invention at present preferred, which is that above described in which the engine is fixed in the fuselage, contemplates additional means for neutralizing the engine torque which consists in a brake, friction clutch or the like, carried by the fuselage and controllably engaging the hub of the counter-rotor. In the preferred arrangement the reduction gearing may be so disposed that the lift rotor revolves in the direction opposite to that of the engine drive shaft. Engagement of the brake then serves to transfer the engine torque to the counter-rotor and, by allowing more or less slippage, also serves as a directional control for the fuselage and the helicopter as a whole, since the engine torque will turn the structure in one direction when the brake is released and the counter-rotor will turn it in the other direction when the brake is firmly engaged. In one preferred arrangement, the torque brake may be connected to a suitable control lever or pedal in the pilot's cockpit, similar to the conventional rudder bar, to which may also be attached a rudder at the tail of the fuselage (in conventional manner) as an additional or supplemental directional control for use in forward flight; although the rudder at the tail may be operated independently of this "torque brake."

The present invention contemplates or includes, furthermore, a novel cantilever form of horizontal blade attachment pivot which enables the use of a more desirable location of the pivot axis with relation to the hub axis than can be obtained with the pivot arrangements hitherto used or proposed.

In conjunction with the said pivot arrangement I may also use hydraulically operated pitch-changing means to be actuated by the pressure of oil delivered from a pump mounted on and driven by the engine, said oil to be conducted from the engine through a hollow drive shaft to a piston in the hollow interior of the spindle of the said cantilever pivot; the motion of the piston in response to variations in oil pressure to be translated into rotation about the longitudinal axis of the lifting blade of the rotor through a lever and the mounting means of the vertical or lag pivot of the blade. The returning oil from the rotor hub may also serve to lubricate the gearing and rotor bearings.

The present invention furthermore contemplates novel control means which causes the thrust of the lifting rotor to be inclined in any desired direction by imposing a cyclic change of pitch on the rotor blades, the azimuth position of the cyclic change as well as the amplitude of said cyclic change being controlled by the pilot, for example by the direction and amount of displacement of a control stick or wheel of conventional type mounted in the cockpit.

A further phase of the present invention contemplates a reduction of the drag of the counter-rotor vanes when the helicopter is proceeding at high speed in forward flight. For this purpose the drag vanes of the counter rotor may be so hinged to their supporting arms that they will swing back when a force is applied to them in the direction of rotation of the counter-rotor but will hold firmly in position when the force applied to them is opposite to the direction of rotation. With this arrangement, in operation, the hinges are not actuated until a forward speed greater than the vane speed in its counter-rotation is attained by the helicopter. At speeds greater than this, the combined velocity of the air passing the retreating vanes is in the direction of the counter-rotation and if the vanes were rigidly attached would cause a drag force opposite to that desired and would furthermore add unnecessarily to the drag of the helicopter as a whole. The hinged construction avoids this difficulty by allowing the vanes to trail in minimum drag position whenever they encounter reversed airflow.

According to a further extension of the automatic hinge principle, a second hinge similar to the first, but operable in the other direction, may be placed between two pairs of the vane surface so that a portion of the vane folds back when the relative velocity over it exceeds a value predetermined by the force of a spring. In this way a helicopter economical of power at low speed may also have low drag at high speed.

The present invention further contemplates, in conjunction with the gearing and counter-rotor, means for effecting a change in reduction ratio of the gears driving the lifting rotor. Rotation of the counter-rotor affects the effective gear ratio between the engine and lifting rotor, in the manner well known in the art of planetary gearing; reduction of rotational speed of the counter-rotor causing an increase in the lifting rotor speed with relation to the engine speed and vice versa. Since the air speed over the vanes increases with forward motion of the helicopter, the force exerted by them increases and the rate of rotation decreases, thereby increasing the rotor speed for constant engine speed with forward speed—a result much to be desired.

An alternative feature of the present invention contemplates, by modification of the proportions of the cyclic pitch change means, a "feathering" action of the blades as a supplementary concomitant of "flapping" in balancing the rolling moment developed when a lifting rotor with generally vertical rotation axis is moved horizontally through the air. A pitch change responsive to "coning," that is responsive to the mean angle between the blade axis and rotation axis, may also be introduced by similar means and may have advantages, particularly to avoid undue slowing up of the rotor in power-off autorotation.

While the primary purpose of the counter-rotor, as explained above, is to provide sufficient drag to counteract the torque reaction of the lifting rotor, by suitable disposition of its parts, it may be utilized advantageously for several other purposes. Thus, the present invention contemplates an alternative arrangement in which the vanes of the counter-rotor are set at a steep positive pitch angle instead of being exactly at right angles to their rotation path. They will then develop a certain amount of supplementary lift force which may be kept at a value low enough to prevent the development of the difficulties associated with rigid lifting rotors. The counter-rotor may furthermore be utilized as an effective agency in counteracting the rolling moment developed by the lifting rotor in forward flight. Even with a precisely normal vane setting a certain amount of rolling moment in the right direction for balance will be developed by the counter-rotor when the entire helicopter is tilted forward by the aerodynamic action of the horizontal tail surfaces (as is contemplated in the preferred form of the invention) because the advancing vanes will thus acquire a certain lifting incidence in relation to the relative airflow. Setting the vanes at an initial positive pitch will augment this action; and setting the vanes at a negative pitch will diminish it.

Overrunning clutch means may also be incorporated for permitting autorotative rotation of the lifting rotor with the engine stopped, as in emergency landing with dead engine, and brake means for stopping the rotor when the helicopter is on the ground, together with novel means for actuating said braking means.

The present invention further contemplates a wide range of adaptation of the helicopter for various flight utilities by variation in the area and number of the counter-rotor vanes utilized. Thus, for high lifting and climbing performance at zero or low forward speed a large drag area of the vanes is advantageous in that it reduces the rotation rate of the counter-rotor and thereby reduces correspondingly the power diverted from lift for the purpose of neutralizing torque reaction. On the other hand, large vane area increases drag resistance to forward motion of the helicopter, and consequently when high forward speed is desired the vane area should be kept low even at a sacrifice of some performance at zero and low speed. Thus, a compromise depending on the type of service desired is contemplated. A further consideration in arriving at the best compromise for any purpose is that of change of rotational speed of the counter-rotor with change of forward speed of the helicopter. As has been stated, the counter-rotor slows up as the helicopter increases its forward speed. If a sufficient speed were attained, therefore, the counter-rotor would stop rotating altogether and the torque reaction would be balanced by the simple aerodynamic drag on the vane, or vanes, on the active side. No power would then be diverted to counter-rotor drive and the only power loss in neutralizing torque would be that resulting from the drag through the air of the active vanes. Since it would be undesirable to have the counter-rotor revolve backwards, the best vane area for high speed would be one which permitted a very slow forward rotation at the highest speed that the helicopter is capable of developing. Calculations indicate that this requirement may be easily fulfilled. They indicate furthermore that a very moderate vane area is sufficient to keep the counter-rotor speed to so low a value that the power consumed by it is less than that consumed, directly or in the form of increased weight, by any other known or heretofore proposed means of torque neutralization.

While in general, as stated above, it is contemplated that the counter-rotor speed be restrained to a value low in relation to the lifting rotor speed, for certain extreme performance requirements, such for example as very high speed, high powered performance, the counter-rotor vane area may be so reduced that the speed of the counter-rotor when the helicopter is in low speed flight is of the same order as, or even greater than, the rotational speed of the lifting rotor. While this would involve a loss of about one-half the supplied power in torque neutralization at low speed, it would very greatly reduce the vane area needed, since the vane area required varies inversely with the square of the counter-rotor speed. Since the counter-rotor is slowed up almost to a stand-still at maximum forward speed this power loss in torque neutralization would not occur at high speed and, on the other hand, the greatly reduced vane area will minimize drag resistance to forward flight. Computations indicate that by such means high speeds comparable to those attained by any existing aircraft may be attainable.

A similar variation in the number of vanes is contemplated in the present invention. The effect of changing the number of vanes, provided the total area remains the same, is to change the smoothness of operation of the helicopter. Any number of vanes greater than one will provide smooth operation in hovering, but this may not be true in forward flight. It is indicated that the smallest number of blades which will give smooth action in forward flight, in so far as primary effects are concerned, is probably four. Four vanes may therefore be preferred, although it seems likely that in certain applications, particularly those in which high speed is stressed, a greater number of vanes, such as eight, may be preferable.

For the purpose of illustrating the present invention, the accompanying more or less diagrammatic or schematic drawings show forms thereof which are at present preferred, although it is to be understood that the various instrumentalities of which the present invention consists can be variously arranged and organized and that the present invention is not limited to the precise arrangement and organization of the instrumentalities as herein shown and described.

Referring to the drawings in which like reference characters indicate like parts, Figure 1 represents a more or less diagrammatic top plan view of a helicopter embodying the present invention;

Figure 2 represents a side-elevational view of the same;

Figure 3 represents a front-elevational view of the same;

Figure 4 represents a top plan view, on an enlarged scale, of one form of hinge attachment of the counter-rotor vanes to their supporting arms, as indicated in Figures 1, 2 and 3;

Figures 5, 6:
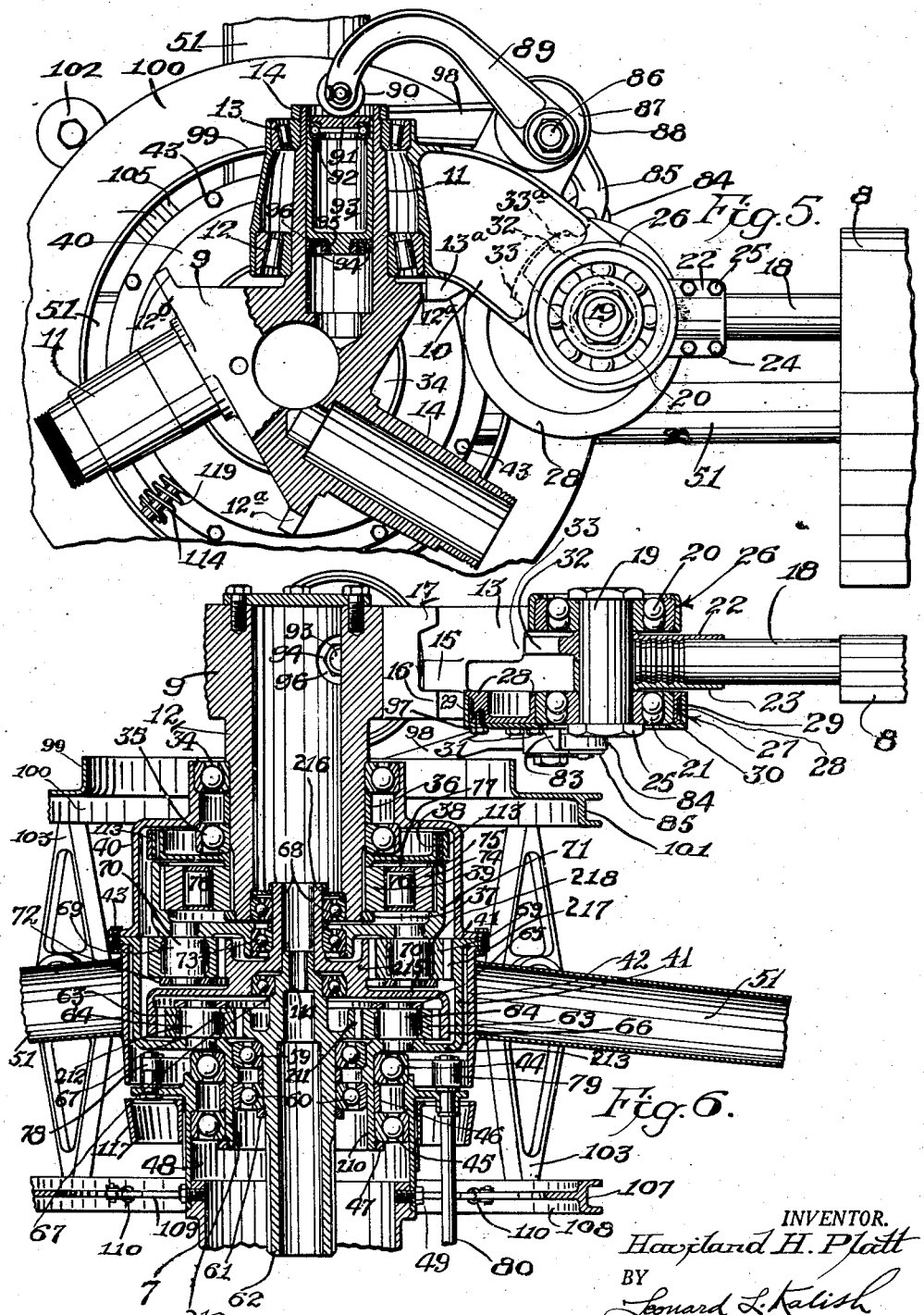
Figure 5 represents, on an enlarged scale, a top plan view, partly in section (generally on line 5—5 of Figure 2), of the lifting rotor hub and one of the horizontal blade supporting pivots; showing also in top plan view the vertical pivot and the pitch regulating mechanism.

Figure 6 represents a fragmentary sectional view, on a similarly enlarged scale, generally on line 6—6 of Figure 1, showing the lifting rotor hub, the counter-rotor hub, with their supports and bearings, the gearing interconnecting said hubs and furnishing the driving reduction between the engine and the lifting rotor, the rotor brake, the fuselage torque brake, the vertical blade supporting pivot and part of the blade pitch control mechanism;

Figure 7 represents a fragmentary, partially sectional view, on a similarly enlarged scale, generally on line 7—7 of Figure 1, showing the lifting and counter-rotor hubs and, more particularly, the cyclic blade pitch variation control mechanism and the rotor brake actuating mechanism.

Figure 8 represents an elevational view of a drag vane of modified construction.

Figure 9 is a much enlarged and fragmentary view of the center pivots and spring-centering means with this modified form of drag vane.

Figure 10 represents a section on line 10—10 of Figure 9.

In the accompanying drawings the fuselage of the helicopter of the present invention is designated generally by the letter "A." The fuselage may be of any suitable shape and construction, as may be necessary to provide seating space for the pilot and passengers, attachment for the landing gear and tail surfaces, suitable mounting for the power plant, and as otherwise may be required by the necessary strength and wind resistance.

The lifting screw or rotor, designated generally by the letter "B," is mounted above the fuselage at the upper end of a suitable pylon, as for instance the tubular pylon 7 and is arranged to rotate about a generally upright axis passing through the generally central portion of the fuselage.

The lifting rotor comprises a plurality of airfoil blades 8 of suitable cross-section. Three blades are shown in the illustrations although the number may be varied, and for some purposes two blades may suffice while for other purposes four or more blades may be desirable. Each of the blades 8, as shown particularly in Figures 5 and 6, is attached to the driving hub 9 through an intermediate link or stub 10, which may be a forging of "H" or other suitable cross-section. The stubs may be enlarged and suitably formed at their ends to form the outer members of pivot joints. The inner end of each stub may be pivotally attached to one of a plurality of pivotal supports or anchorages, which are here shown as tapered cantilever spindles 11, by means of the tapered roller bearings 12 and 13 and the retaining nut 14 or other equivalent means. The spindles 11 are shown in the drawings as integral parts of the hub 9 and with their axes slightly offset from the hub axis. This setting is believed in practice to provide advantageous control characteristics in the performance of articulated rotors. The spindle position may however be varied from zero, or even from a negative offset, to any desired amount of positive offset. Furthermore the spindles 11 may be made separate from the hub 9 with base flanges bolted to the hub, in which case the offset may be adjustable.

The pivot joints so formed allow the stubs 10 and their respective blades 8 to swing or flap freely in planes in which the hub axis generally lies or in planes disposed in the same general direction as the hub axis. The downward and upward limits of deflection may be fixed by any suitable means such as the engagement of the lug 15 on each stub 10 with suitable projections or abutments 16 and 17 on the hub 9. These limits are so arranged as not to interfere with the perfect freedom of the blade to find its equilibrium position, as determined by the balance of centrifugal and lift forces under all operating conditions. The limit stops serve in general only to support and limit the motion of the blades when the helicopter is on the ground with the rotor stationary or revolving at low speed.

At its outer end the stub 10 is attached to the tubular spar or other suitable spar or blade-root 18 of the blade 8 by means of a pivot joint with generally vertical axis or generally upright axis, including the pivot pin 19, the self-aligning ball bearings 20 and 21, which support the opposed ends of the pivot pin 19 in the two bifurcated ends of the stub 10, and the labyrinth clamping members 22 and 23 which hold the blade spar or blade-root 18 and firmly embrace the pivot pin 19. The pivot assembly is securely held together by the bolts 24 and the nut 25 (or by any other suitable means).

The bearings 20 and 21 may be retained in cylindrical recesses 26 and 27 in the forked outer end of the stub 10, the lower bearing 21 having interposed between it and the wall of the recess 27 a flanged eccentric 28, the friction of which relative to the wall of the recess 27 may be minimized by the interposition of needle rollers 29, and which is retained by the cover plate 30 and the bolts 31.

As a result of this construction the blade 8 is free at all times during flight to swing freely about the upright pivot axis 19 and to find its equilibrium position as determined by the balance of centrifugal and drag forces, while the angle of the pivot pin 19 to the vertical, or with respect to the hub axis, may be varied by rotation of the eccentric 28 and the pitch of the blade 8 thereby altered without impairment of the swinging freedom of the blade about the upright pivot 19. A slight misalignment of the stub and the blade in the generally vertical plane will be caused by rotation of the eccentric 28; such misalignment is, however, of negligible magnitude within the range of variation required in operation.

In order to prevent excessive lag of the blade when torque is applied to accelerate the rotor when stopped, or running slowly, and to prevent corresponding excessive forward swinging of the blade when the rotor brake is applied to stop the rotor, a projection 32 or equivalent means may be provided on the blade-clamping member 22, adapted to engage the stop lug 33 formed on the stub 10 and a corresponding second lug 33—a similarly formed at the other side of the stub 10, sufficient clearance being allowed between the stop lugs 33 and 33—a and the projection 32 to prevent engagement of the projection 32 during normal flight operation.

In the drawings, particularly Figure 5, the vertical or upright pivot axis 19 is placed approximately 80 degrees behind the horizontal (or lateral or flapping) pivot axis 11. This location is determined as a compromise between the precise geometric requirements of the various operating conditions to which the rotor may be subjected. Thus in autorotative operation, when no torque is applied at the hub and the total mean drag of each blade is zero, the blades assume a mean position with their axes passing directly through the hub axis. For geometric precision under these circumstances the blade axis should lie at an angle of 90 degrees to the horizontal pivot axis 11. On the other hand when the rotor is operating under full power, the blades may lag 20 degrees or more behind the autorotative radial disposition, the exact amount of lag depending on a number of factors, such as the length of the stub 10, the speed of rotation of the rotor as determined by the engine power and speed and the gear reduction ratio, and the weight of the blades. The position shown represents a compromise between these two extremes, but it may be considerably departed from without materially affecting practical performance.

In Figure 5 the blade 8 is shown lagged about 10 degrees behind a radial position, which represents the position assumed when partial power is applied to the rotor as in cruising or slow flight. Under these circumstances the blade axis lies approximately at right angles to the horizontal pivot axis and the flapping motion about that axis closely approximates geometric precision.

The hub 12 is rotatably supported in the radial ball bearing 34 and the combined radial and thrust ball bearing 35, separated by the spacing sleeve 36 and retained on the hub 9 by the nut 37 through the hub of the brake drum 38 and the inner race 39 of a roller type overrunning clutch (the other parts of which are the outer camming race 74 and the wedging rollers 76); said brake drum 38 and the said clutch race 39 being secured to the hub 9 against relative rotation by splines and being axially secured to the hub 9 by the nut 37. The outer races of the hub bearings 34 and 35 are supported by the gear-case cover 40, which is rigidly secured to the gear-case 41 and the counter-rotor hub 42 by bolts 43 or other suitable means. The gear-case 41 is mounted, by means of a cylindrical extension 110 at its lower end, in the radial ball bearing 44 and the combined radial and thrust ball bearing 45, separated by the spacing sleeve 46 and retained by the nut 47. The outer races of the gear-case bearings 44 and 45 are supported by the pylon head 48 which fits over the upper end of the pylon tube 7 and is secured thereto by any suitable means such as the bolts 49. The pylon 7, which may be covered in any suitable manner by a streamlined fairing over its portions exposed to the airflow, is attached at its lower end to the fuselage "A" by any of the means well known in the art of rotative winged aircraft, and serves to support the weight of the fuselage and its contents in flight and the weight of the rotors and gearing when on the ground, while at the same time transmitting the torque of the engine 50 (shown in dotted outline in Figure 2) to the gear case 41. Alternatively, diagonal bracing may be used to stiffen the pylon in the manner well known in the art.

The counter-rotor hub 42 may be secured against rotation relative to the gear case 41 by external splines on the gear-case engaging internal splines on the hub and thus becomes an integral operating part therewith. To the outer cylindrical surface of the counter-rotor hub 42 are rigidly secured by welding, or any other suitable means, a plurality of tubular arms 51 which extend generally radially outward and preferably slightly downwards therefrom. Attached to the outer end of each arm 51 (by welding or other suitable means), is a hinge fitting 52 which is forked and adapted to receive the hinge pin 53 by means of which the fitting 52 is pivotally secured to a corresponding hinge fitting 54, having a single pivot lug fitting within the forked end of the fitting 52 and being pivotally attached thereto by the pivot pin 53, which is retained by the cotter pin 55, or other suitable means. The coiled spring 56 surrounding the end of the pivot pin 53 has its free ends bent down and secured in holes, one in each of the hinge fittings 52 and 54. The spring 56 is given an initial tension tending to hold the two fittings in alignment, with their flat ends abutting. The fitting 54 is welded, or otherwise secured, to the tubular spar 57 which may form the main stiffening spar of each of the light and generally circular drag vanes 58. The drag vanes 58 may be constructed in accordance with any of the methods well known in the aeronautical construction art. The tension of the spring 56 is preferably only sufficient to insure alignment of the spars 57 with the arms 51 when no considerable force is acting on the vanes 58 tending to swing them out of alignment.

According to an optional further phase of my invention, one or more additional hinges or pivots, which may be similar to the one illustrated in Figure 4, but operable in the other direction, may be included between parts into which the vane surface may be divided. In such case, the spring corresponding to 56 may be given a greater effective tension than that of 56, whereby the hinge will be prevented from actuation at relatively low airflow velocities. At high speeds of the helicopter, then, portions of the drag vanes are thus permitted to fold back when moving forward, and their parasite drag area is thus reduced. Incidentally, their form in the airstream will also become more stable and the supporting structure, therefore, less subject to vibration. In order to avoid the necessity for high spring tension, the principle of aerodynamic counterbalance may be employed. For example, if the circular vanes 58 illustrated are centered on the spars 57, each vane may be divided into two more or less semicircular parts by a diameter oblique to the spar, and each half vane pivoted on the spar with a spring tending to hold the two semi-vanes in alignment. Then the obliquity of the dividing diameter will determine the amount of counterbalance between the limits of zero when the dividing diameter is made parallel to the spar, and full counterbalance when the dividing diameter is made at right angles to the spar. Many variations in detailed application of this principle are within the purview of the present invention. By such means the advantages of large vane area at low speeds may be combined with the advantages of small vane area at high speeds.

In Figures 8, 9 and 10 there is illustrated a device of this character which permits free feathering of the vanes when retreating, and spring controlled feathering when advancing, both vane portions being free to float in both conditions. This latter may be an important or desirable requisite, since otherwise objectionable vertical forces may be developed at the support ends, at some positions in the revolution. That is, when advancing, the vane of Figure 8 is moving into the paper. The vane is divided into the two portions $a$ and $b$, supported on bearings to swing on the vane support $c$. Part $a$ has a greater area below the pivot axis and $b$ greater area above. Both vane portions are mass balanced so as to avoid inertial and gravity swinging.

In Figure 9 the two central bearing members of the vane portions $a$ and $b$ are illustrated partly in section. The outer bearings (not shown) may be of any suitable type such as plain bushings with thrust collars. The inner bushings $d$ are fitted with means for retaining the ends of the spring $e$, such as the axial holes shown. Each bushing $d$ is formed with two axially extending dogs $f$, which engage the extending ends of the pins $g$, and is thus restrained from turning farther in response to the torsional tension of the helical torsion spring.

A second bushing $h$, concentrically mounted on the first, is free to rotate thereon within the limits imposed by the radially extending pins $i$ (carried by the bushing $d$) in the slots $j$ formed in the bushing $h$. The bushings $h$ may be formed with flanges $k$ for securing them to suitable structural members of the vane parts, such as webs or ribs $m$ or the like, by means of the bolts shown, or otherwise.

In operation, the device is assembled with a strong initial tension on the spring $e$, which holds the dogs $f$ in firm engagement with the pins $g$ (the arrangements of dogs and pins in the vane portion $b$ being the reverse of those shown for the vane portion $a$ at the left). When the vane is advancing, that is, moving into the paper, the air pressure tends to cause the lower part of $a$ and the upper part of $b$ to lag, that is, swing out of the paper relative to the support. This swinging is restrained by the pins $i$, which cause a tendency for the bushings $d$ to assume the same rotation, against the spring tension. When the velocity of the air relative to the vane attains a predetermined value, greater than that encountered when the helicopter is operating vertically, the spring tension is overcome and the dogs swing clear of the pins. As the air speed increases the vane portions may swing to positions almost at right angles to their original ones and into more or less alignment with the airflow; the drag being thus greatly reduced. While the dogs $f$ are clear of the pins $g$, the vane is free to float like a weather vane, insurance being thus provided against side forces.

As the relative velocity over the vanes diminishes, the vane portions swing back into alignment under the influence of the spring tension. If now the relative air flow changes direction, the dogs prevent further backward rotation of the bushings $d$, but the bushings $h$ may rotate on the outside of the inner bushings $d$, thus permitting further backward swinging of the vane portions $a$ and $b$, which may thus take up trailing low drag positions, each being free of the other and of the support within the limits imposed by the slots $j$. The pins $i$ may be so located with relation to the slots that swinging past center is impossible, correct reversal being thus assured when the airflow is again reversed.

Light springs may be interposed between the inner and outer bushings if restraint on the backward swinging is desired.

While the forms and collective arrangement of the various parts of the counter-rotor vanes described above are at present preferred by me, they may be widely varied within the purview and essentials of the present invention. Thus the vanes may be of paddle form instead of circular; they may be cupped or given any other suitable cross-section. The vanes may be rigidly attached instead of hinged to the supporting arms 51. The supporting arms may be interbraced for greater rigidity or they may be attached to the hub by pivots or other joints permitting various degrees and kinds of freedom. The vanes may be set at various angles to the plane of their rotation, either fixed or controllable. Special means, other than those described above, may be employed for reducing the drag of the vanes in high speed forward flight by aligning them generally with the direction of flight, or otherwise. The vanes may be greatly varied in size, and the diameter of the counter-rotor in relation to the lifting rotor may be widely varied. These are some of the many possible variants or extensions of the more concrete embodiments herein more particularly shown and described, all of which come within the broad confines of the counter-rotor principle forming the essence of one phase of the present invention.

Mounted within the cylindrical extension 210 of the bottom of the gear case 41, are the radial ball bearing 59 and the combined radial and thrust ball bearing 60, separated by a spacing sleeve and secured by the nut 61 to the drive pinion spindle 62, which is splined at its lower end for engagement with the drive shaft leading from the vertical crank shaft of the engine 50, which may be of the blower cooled radial or any other suitable type. Immediately above the bearing 59 there is formed integrally with, or otherwise attached to, the spindle 62, the drive pinion which is the sun pinion 211 of a planetary gear train about to be described.

Meshing with the drive pinion 211 and disposed circumferentially around it are a plurality of planet pinions 63 mounted on spindles 64 on suitable antifriction bearings such as the needle roller bearings 212 shown, so as to be freely rotatable about the pinion spindles 64. The spindles 64 are retained in fixed relation to the gear case 41; one end of each spindle 64 being retained in a suitable cylindrical aperture in the lower horizontal end-wall 213 of the gear-case 41, while its other end is similarly retained in the cage plate 65, which is rigidly secured to the gear case 41 by bolts and spacers (not shown) suitably disposed in the spaces between the planet pinions 63.

The teeth of the planet pinions 63 are in mesh, at the outer portions of their peripheries, with the internal teeth of the internal ring gear 66 which is mounted on the radial ball bearing 67, the inner race of which is mounted on an extension 214 of the drive pinion spindle 62. An upward extension 216 of the ring gear 66 is supported by the radial ball bearing 68 mounted in the hollow interior of the lifting rotor hub 9, thus insuring exact alignment of the gearing.

The outer periphery of the central portion 215 of the ring gear unit 66 is formed as a second sun pinion of a second planetary gear train. A plurality of planet pinions 69 are circumferentially disposed about the sun pinion 215 in mesh with it, while their outer peripheral portions mesh with the internal ring gear teeth 217 formed on the inside of the upper portion of the gear case 41. The planet pinions 69 are mounted, through needle roller or other suitable bearings 218, to rotate on planet pinion spindles 70 which are retained in fixed relation to the bell-shaped planetary arm member 71, by extensions on the spindles 70 fitted into suitable recesses in the bell-shaped member 71 and by extensions on the other ends of the spindles 70 fitted into similar recesses in the cage plate 72, which latter is, in turn, secured to the member 71 by bolts and spacers (not shown) passing through the spaces between the pinions 69. The bell-shaped planet arm member 71 is mounted on the radial ball bearing 73 internally supported by the upper extension 216 of the ring gear 66 and separated from the bearing 68 by a spacing sleeve. The cylindrical portion of planet arm member 71 is internally splined to engage external splines on the outer race or cam member 74 of the over-running clutch, which is retained within the member 71 by the internal nut 75 or other suitable means. The cam member 74 is recessed internally with a plurality of eccentrically inclined wedging surfaces adapted to engage, by wedge action, a plurality of rollers 76, in the manner well known in the art of over-running clutch construction; thus imparting the final drive torque to the inner race 39 and to the lifting rotor hub 9 splined to said inner race 39. The rollers 76 are held in alignment by a cage of suitable form such as 77, or by any other suitable means.

If the gear case 41 is held stationary the rotor drive is then from the engine drive shaft through the driving pinion spindle 62, the planet pinions 63, the ring gear 66, the planet pinions 69, to the planet arm member 71 which rotates, as a unit with the lifting rotor hub 9, when driving. The ring gear 66 rotates in the opposite direction to that of the drive pinion spindle 62, while the member 71 and with it the lifting rotor hub 9 rotate in the same direction as the ring gear 66. Thus, the drive direction is reversed between the engine and lifting rotor, while the combined gear reduction of the two planetary trains, when the gear case is stationary, is the product of the individual ratios of the two separate planetary trains. In operation, however, the gear case 41 rotates with the counter-rotor (under the influence of the torque reaction imparted to it by the teeth of the planet pinions 69 of the second gear train and by the planet pinion spindles 64 of the first gear train) in a direction opposite to that of the lifting rotor and the same as that of the engine drive shaft. The effect of this rotation of the gear case is to increase the effective combined reduction ratio of the composite gear train. Since the counter-rotor revolves at a lower rate of speed at high forward speeds of the helicopter than at low speeds, the reduction ratio between engine and lifting rotor will be smaller at high forward speed than at low forward speed. The several gears and pinions of the two planetary trains are therefore given the relative numbers of teeth which will produce whatever reduction ratios are desired for the two extreme conditions of power flight. In case of engine failure, or reduction of engine speed by throttle operation or otherwise, the lifting rotor may continue to rotate independently of the gearing through the release of the overrunning clutch rollers 76 in the manner well known in the overrunning clutch art. There being then no torque reaction, the counter-rotor remains stationary except for such slow rotation as may be imparted to it by the action of air currents induced by forward motion of the helicopter.

Since the gear case 41 is mounted for free rotation on the pylon head 48, through the bearings 44 and 45, no torque reaction can be imparted by either the lifting rotor or the counter-rotor to the pylon 7 and the counter-rotor must, consequently, assume at all times a speed of rotation at which its drag torque balances the reaction torque of the lifting rotor. The engine torque may however be imparted to the pylon 7 through the engine mounting and the attachment of the pylon to the fuselage at its lower end. This engine torque reaction would, if no restraining means were provided, turn the fuselage uncontrollably about the pylon axis in the direction opposite to the engine drive shaft rotation, that is in the same direction as the rotation of the lifting rotor, and in the direction opposite to that of the counter-rotor. Frictional engagement of the pylon head with the counter-rotor will therefore tend to restrain the turning of the pylon and fuselage, while a locked engagement will turn the fuselage in the direction opposite to that in which it turns when free. Since the engine torque is only a small fraction (the inverse of the combined reduction ratio) of the lifting rotor torque, the rate of rotation of the counter-rotor is only slightly affected by the engagement or disengagement of the pylon head with the counter-rotor, the said rate of rotation being slightly less with the pylon engaged than with it free. For the purpose of providing controllable engagement of the pylon with the counter-rotor a double shoe internally expanding brake 78, actuated by the rotatable cam 79, of any suitable or conventional type as known in the brake art, may be mounted in any suitable manner such as that illustrated in Figure 6 on a flange formed integral with, or otherwise attached to, the pylon head 46. The brake 78 may be controllably actuated by rotation in one direction or the other of the shaft 80, to which the cam 79 is rigidly attached by key and cotter-pin or otherwise. Turning the shaft 80 in one direction then causes the shoes of the brake 78, which are faced with suitable friction material, to expand against the interior of the lower cylindrical extension of the counter-rotor hub 42, the amount of torque applied to the control shaft 80 determining the amount of torque which is opposed to the engine reaction torque by the counter-rotor, and so determining also the direction of turning of the fuselage about the pylon axis. The control shaft 80 may be connected through suitable universal joints, levers, cables and preferably a spring of suitable tension to any convenient control device, such as the conventional rudder bar (not shown) in the pilot's cockpit 81. As a supplementary turning control a conventional rudder 82 may be provided either independently of or connected to the same pilot's control device, as is the torque brake control. At high forward speed then the rudder 82 may, by virtue of the strong aerodynamic forces then available to it, take over all or a part of the function of the torque brake thus reducing the slight loss of power in friction in the brake. With power off, the brake is ineffective as a control and the rudder together with lateral inclination of the lifting rotor thrust must be relied on for directional control, in the manner well known in the rotative winged aircraft art.

While I have in detail shown and described the gearing and directional control arrangement at present preferred by me, many other arrangements and forms of the component parts may be made without departing from the spirit and intent of my invention, as for example, a disposition of the engine to rotate with the counter-rotor, in which case the directional control would assume a quite different form; the placing of the engine shaft horizontal with drive through bevel gears; the substitution of bevel or other gears for the spur gears shown; the substitution of disk or hydraulic clutch of any of the known types for the simple torque brake; rotation of the rotor in the same direction as the engine, the stationary torque brake being then replaced by a rotating brake driven by the engine at a speed higher than the counter-rotor speed.

In helicopter flight it is essential to vary the pitch of the lifting rotor blades to accommodate the widely changing conditions of flight which must be provided for. Thus, full power operation in climb or forward speed requires a pitch angle of ten degrees or more, while the maximum angle permissible in auto-rotative emergency descent is not more than four degrees. For this purpose, one phase of my invention includes novel and advantageous means for varying and controlling the blade pitch automatically or manually, at the option of the pilot. Thus, the eccentric 28, which houses the lower blade pivot ball bearing 21 and is rotatably mounted in one of the fork ends of the stub 10, has rigidly secured to it, either as an integral part of the plate 30 or otherwise, a lug 83 which engages a roller 84 suitably secured in the forked end of a lever 85. The lever 85 is rigidly secured, as by key, washer and nut, to the short shaft 86, which is rotatably supported, through needle rollers or otherwise, in the eccentric 87. The eccentric 87, whose further functions will be described later, is similarly supported in the bracket 88 formed integrally with or otherwise rigidly attached to the link stub 10. A second lever 89 is secured to the upper end of the shaft 86 in a manner similar to the attachment of lever 85 at its lower end. The levers 85 and 89 and the shaft 86 thus form together an offset bell-crank lever, with the shaft 86 acting as pivot. Rotatably supported by cotter pins and washers, or other suitable means, in the forked end of lever 89 is a follower roller 90, bearing on the plate 91, which latter, together with the ball thrust bearing 92, forms the outer end of the hydraulic piston 93, which is slidably contained within the hollow cylindrical interior of the pivot spindle 11 of the hub 9. The inner end of the piston 93 is packed against fluid pressure by suitable means such as the cup leather washer 94, retained by the nut 95 and the washer 96, which latter is flanged to form, in engagement with the shoulder at the inner end of the cylinder, a stop to limit the inward travel of the piston 93.

When the rotor is running at operating speed, the centrifugal force of the blade 8 tends to turn the eccentric 28 in the clockwise direction as viewed from above, owing to the relative location of the axes of the pivot pin 19 and the eccentric 28. The lug 83 is thus kept at all times during flight firmly pressed against the roller 84, the pressure on the roller 84 being thence transferred through the lever 85, the shaft 86 and the lever 89 to the piston 93. Outward displacement of the piston 93 under the influence of fluid pressure in the cylinder will thus produce a counter-clockwise rotation of the eccentric 28, the pivot pin 19 being thereby inclined and the pitch of the blade 8 increased. An overbalancing of the fluid pressure in the cylinder by the centrifugal force of the blade 8 will, on the other hand, lead to a reduction of blade pitch. Since the plate 91 on which the roller 90 rests is free to rotate about the flapping pivot axis, and since the bracket 88 supporting the actuating levers 85 and 89 is carried by the stub 10, the pitch control is entirely independent of flapping and the blade pitch remains unchanged when the blade swings about the flapping pivot. Stop means are provided to prevent excessive rotation of the eccentric 28 in either direction when the rotor is stopped or running at low speed, such as the lug 97, formed on the eccentric retaining wall 27 engaging a suitable recess in the periphery of the plate 30.

Oil for operating the piston 93 may be supplied by a suitable oil pump on the engine 50 through the hollow interior of the engine drive shaft, the drive pinion spindle 62, the ring gear member 66 and the hub 9; the joints between these parts being suitably sealed to hold the pressure. The pressure of the oil acting on the piston 93 may be under direct control of the pilot by means of a suitable valve or preferably the engine may be equipped with a constant speed governor, of the type well known in the constant speed propeller art, which may furthermore be equipped with a manual adjustment for controlling the speed at which it is set to operate. With this device in operation, the blade pitch is altered automatically with changing flight conditions in such a manner that the engine speed remains constant, as in the well known art of constant speed propellers. If the engine stops, the oil pressure on the piston 93 falls and the centrifugal force of the blade 8 returns the pitch to the predetermined minimum setting, as determined by the limit stops or by the location of the pivot axis with relation to the eccentric axis, which is set for suitable operation in autorotation. Provision may be made, if desired, for a small amount of oil leakage from the lower end of the hub 9 to serve as lubricant for the bearings and gears, the oil being returned to the engine crank case through the pylon tube 7. The details of the pitch regulation system here shown and described are for purposes of illustration, and may be varied by the substitution of equivalent means without departing from the present invention.

The propulsive force to move the helicopter forward, backward or laterally is most readily derived from an inclination of the lifting rotor thrust in the desired direction. This may be achieved by imposing a cyclic change of pitch on the rotor blades so that they will produce a greater lift in one part of their travel than in that diametrically opposite. The equilibrium position of the blades is then higher on the side of greater lift and the blades will flap as they revolve, thus inclining the virtual rotation axis of the blades away from the greater lift side, and so directing the thrust in that direction. Means for producing and conveniently controlling this action are illustrated in the drawings.

Rigidly attached to the lower face (by bolts or otherwise) of the eccentric 87 of each pitch control unit is an offset lever 98 which carries a roller mounted rotatably in its forked outer end. These rollers on the levers 98 run on the cylindrical flange 99 of the floating ring member 100, the lower portion of which is formed as a double flanged cylindrical track 101. Engaging the track 101 and supporting the ring member 100 are four circumferentially disposed and distributed and equally spaced rollers 102. Each of the rollers 102 is rotatably mounted, by a nut or otherwise, on the upper end of a rocker arm 103 which is pivoted on a pin 104, retained by cotter pins, or other suitable means, in a bracket 105 rigidly mounted on the counter-rotor hub 42 by welding or by other means. A roller 106 is rotatably mounted at the lower end of each rocker arm 103 and engages a double flanged cylindrical track 107 on the periphery of a control ring member 108. Attached to an internal flange integral with ring member 108 are four equally spaced control cables 109 by means of the shackles 110 and shackle pins and cotter pins. The control cables 109 pass over pulleys 111 suitably supported on the pylon head 48, as by means of eyes formed in the heads of some of the bolts 49. Thence the four control cables pass down along the pylon into the fuselage 6 where they may be led over suitably disposed pulleys to a control "stick" of conventional type in the pilot's cockpit 81.

Each opposite pair of cables 109 is oppositely connected to the control "stick" in the usual manner of aileron and elevator control cables in the airplane control art, so that a pull on one cable in response to a movement of the control "stick" is accompanied by a slackening of the opposite cable. The appropriate motion of the control "stick" thus gives rise to a lateral displacement of the ring member 108 in a direction predetermined with relation to the direction of the displacement of the control "stick." To prevent undue restraint on this displacement caused by tightening up of the cable pair not actuated, all four cables may be made long enough to allow sufficient slack to avoid such binding. Preferably the cables may be fitted with take-up springs of suitable tension to prevent objectionable slackness. The rocker arms 103, being attached to the counter-rotor hub 42, are carried around with it, the rollers 106 running around in the flanged track 107. The rollers 102 similarly roll around in the flanged track 101. The lateral displacement of the ring 108 therefore causes a rocking displacement of at least two of the rocker arms 103, which in turn forces the floating ring 100 out of center in the direction opposite to that of the displacement of the control ring 108. A displacement in line with two of the rocker arms gives rise to a certain amount of freedom of play for the intermediate rocker arms. The tracks 107 and 101 are made deep enough to avoid any possibility of the escape of a roller within the limits of displacement permitted. As the counter-rotor hub 42 rotates, successive pairs of the rollers 106 pass the axis of greatest displacement of the control ring 108. The rocker arms 103 are thus given a cyclic rocking motion as they move around; the position in space of the floating ring 100 (with relation to the rotor hub axis) remaining the same as if the rocker arms were not rotating and rocking. As the roller at the end of the lever 98 runs around the cylindrical flange 99 it is displaced cyclically radially in and out as the result of the displacement of the floating ring 100; an inward force on the roller being maintained (while the rotor is running) by the centrifugal force of the blade 8 acting through the intermediate eccentrics and levers. The lever 98 is thus given a cyclic rocking motion which it imparts to the eccentric 87 and to the levers 85 and 89 supported by the eccentric 87, their support being eccentric to the rocking axis of the eccentric 87. The rocking displacement of lever 85 is imparted through the roller 84 to the eccentric 28, the pivot pin 19, and so to the blade 8 as a cyclic change of pitch having a period of oscillation equal to one revolution of the lifting rotor. The azimuth position of maximum pitch displacement is determined by the direction of displacement of the control ring 108 and so by the direction of displacement of the control "stick" in the cockpit, while the amount of the maximum pitch displacement is determined, within the limits imposed by the proportions of the parts, by the amount of displacement of the control "stick." The floating ring 100 is pressed in equally at the three or more points of roller contact with the rollers of the levers 98, and since the force on each of these rollers increases with outward displacement and decreases with inward displacement, the mechanism will be self centering and will progressively resist displacement in any direction; the parts being so proportioned that this resistance is well within reasonable limits for the convenience of the pilot in all possible positions. The ring 100, being dragged by two different frictional forces, will assume a rotation intermediate between that of the lifting rotor and that of the counter-rotor, which rotation will have no effect whatever on its functioning in the control mechanism. If the parts are so disposed that the effective limit stop on minimum blade pitch is the engaging of the flange 96 with the shoulder in the inner end of the cylinder, then the cyclic pitch control means will be fully effective with the engine stopped as well as with it up to full governor speed.

Reference particularly to Figure 5 shows that the cyclic pitch variation control is not entirely independent of flapping. With the proportions illustrated the amount of cyclic change caused by flapping is negligibly small. By changing the length of the lever 98 however, it may be considerably increased, the phase relationship to the flapping displacement being in one orientation when the lever is shortened and 180 degrees displaced therefrom when the lever 98 is lengthened sufficiently. As is well known in the art, articulated rotors in forward motion are subject to a certain amount of undesirable lateral thrust inclination due to the failure of the flapping action completely to balance, neutralize or correct the rolling moment. A cyclic pitch change, or "feathing," applied as a concomitant of flapping in the correctly determined azimuth, is a valuable corrective to this condition. The lever 98 may therefore be so proportioned, if desired, as to produce a corrective effect of this kind.

When the helicopter proceeds in the forward direction a relative airflow is produced which may be utilized as a supplemental means of tilting the lifting rotor thrust for propulsion. Thus the adjustable or controllable horizontal hinged surfaces 112 may be provided at the tail of the fuselage "A," which act in the manner well known in the airplane art to tilt the entire helicopter in the vertical median plane and thus change the inclination of the thrust direction of the lifting rotor. The surfaces 112 may be connected to any suitable control device, such as any of those used for a similar purpose in the airplane art.

The method of propulsive force production herein shown and described, and the disposition of the control means associated therewith, is for the purposes of illustrating one embodiment of my present invention, and the details of construction and arrangement may be varied without departing from the substance of my present invention. Thus, for example, forward propulsion may also be derived from one or more horizontally acting propellers, driven from the same engine as the rotor or from a different engine; propulsion may be obtained by a tilting of the rotor hub relative to the fuselage, in the manner well known in the art; propulsion may be derived wholly from bodily tilt of the helicopter as a whole, either by the shifting of weights or by the controlled action of airflow over suitably disposed aerodynamic surfaces, said airflow being either that of the rotor slipstream, that induced by motion of the helicopter or a combination of both; propulsion may be obtained by the controllable tilting action of one or more vertically acting propellers spaced from the rotor axis; and many variations in detail and disposition of control means may be applied to each of these methods, as well as to the method here described and illustrated.

When the helicopter is on the ground the lifting rotor would be kept in rotation by the action of the wind, when sufficiently strong, if means were not provided for arresting it. For this purpose a rotor brake of any suitable type may be provided, such as the one whose action is particularly illustrated in Figure 7. A plurality of inwardly acting brake shoes 113, lined with suitable friction material, are disposed circumferentially about the rotor brake drum 38 so as to grip it when forced inward. Rigidly secured to each of the brake shoes 113 is a radially extending plunger 114, engaging at its outer end the end of the rocker arm 115. The rocker arms 115 are pivotally mounted on pivot pins 116 carried by the brackets 105, the pivot pins 116 being retained by cotter pins or other suitable means. The lower ends of the rocker arms 115 engage a slidable ring member 117 which is formed with a conical outer surface. The member 117 is adapted to slide axially on the exterior surface of the pylon head 48 and is restrained from rotating by splines, or other suitable means. Brake rods 118 may be secured to the member 117 by screw threads or other suitable means. The brake rods 118 are connected by means of a yoke, levers and rods, or other suitable means well known in the brake art, to any convenient control handle or pedal (not shown) in the cockpit. The springs 119, retained by washers and cotter pins, or other suitable means, serve to ensure complete release of the brake when the control is in the off position. The rotor brake is capable in itself of holding the lifting rotor in fixed relation to the counter-rotor, which should usually be at rest when the power is off on the ground. If necessary, however, both rotors may be additionally secured against rotation by the application of the torque brake 78 as well as the rotor brake 113. While the provision of a brake of the general type described, is preferred by me, the inclusion or non-inclusion of a rotor brake, or the widely optional diversity of its arrangement and parts, if included, are in no way restrictive of my invention.

For purposes of stabilization in forward flight the fuselage "A" may be equipped with horizontal and vertical fixed tail surfaces 120 and 121 of suitable form and location.

The landing gear may be of any of the well known types, such as the four wheeled, cantilever strut arrangement 122 shown diagrammatically in Figures 1, 2 and 3. For some purposes caster wheels, multiple struts, long travel shock absorber struts, three wheels, disc or skid supports, retractable gears, load equalizing devices, or any of the other known landing gear instrumentalities or arrangements may be found desirable and may be used without departing from my invention.

In operation, the control of the helicopter illustrated may follow closely that of the conventional airplane. In preparing for a take-off, the rotor brake is first released and the engine started. A manually controlled clutch may or may not be included between the engine and the drive shaft. If a clutch is included, it is next engaged. While the engine is turning slowly for warming up, the blade pitch assumes its low limit value, thus avoiding premature lifting forces. The counter-rotor is then turning very slowly in response to the low torque reaction moment. When ready to rise, the pilot opens the engine throttle, whereupon the engine speed increases rapidly to that for which the constant speed governor is set; the blade pitch simultaneously increasing to an angle at which the drag is sufficient to absorb the engine torque as amplified by the reduction gearing and the blades rising as their lift increases until a "cone angle" is attained at which the lift force is balanced by the vertical component of the centrifugal force and the counter-rotor increasing its rate of retrograde rotation until the drag of its vanes balances the torque reaction moment of the lifting rotor.

As the machine rises the pilot may at will operate the directional control for forward, backward or lateral inclination of the climbing path; forward motion of the control handle being so related to the cyclic pitch-changing mechanism that it produces an increased blade angle of the blades while passing the rearward portion of their revolution (similar correlations applying to motions of the control in the other direction). The pilot may similarly turn the helicopter by actuating the control connected to the torque brake. Thus, for instance, by depressing the right-hand pedal of a conventional two-pedal arrangement, increased engagement pressure of the brake may be caused, and so the fuselage may be caused to be turned with the direction of rotation of the counter-rotor. Similarly, by depressing the left-hand pedal, the brake may be released somewhat and the engine torque allowed to turn the nose of the fuselage to the left.

When in the air, vertical motion is controlled by the throttle, direction of pointing mainly by the foot pedals, and direction and speed of motion by the control "stick." The range of cyclic pitch change (of rotor blades) need not be sufficient for propulsion at high forward speed. Any desired portion of the necessary forward tilt can be produced by the setting of the horizontal tail surfaces, which may be adjusted by the pilot in the same manner as the conventional airplane stabilizer adjustment. As the forward speed increases, the rate of rotation of the counter-rotor decreases and the lifting rotor speed increases on account of the decrease in gear reduction ratio thus produced; the blade pitch thus being kept at a lower value than would otherwise have been required and the ratio of forward speed to blade tip speed remaining within practical bounds even at very high forward speeds. Pulling back the control "stick" and at the same time closing the throttle somewhat will bring the helicopter to a standstill within a very short distance.

In case of engine failure, the overrunning clutch permits continued rotation of the lifting rotor, which immediately and automatically assumes the blade pitch suitable for autorotative operation. Descent may then be safely made at low speed, either vertically or in a forward guide, in the manner well known in the art of autorotative aircraft. The controls function in the same way as with power on except that, there being no engine torque and the counter-rotor being stationary, the turning control dependent on them is inoperative. Its functions may then be adequately served by lateral motion of the control "stick," which is capable of producing a spiral turn as is well known in autorotative aircraft, or an auxiliary rudder may be connected to the rudder pedals for this purpose and for reducing wear of the torque brake lining in power-on forward flight.

Calculations show that with the proportions shown in the drawings the counter-rotor will run at approximately one-quarter the speed of the lifting rotor, thus absorbing one-fifth of the total power available, while the helicopter is hovering. An additional approximate 3 per cent is absorbed by the torque brake. The arrangement lends itself to light construction, thereby saving the equivalent of a large amount of power over other known types of helicopter. The single lifting rotor permits much lower disk loadings than are possible with multiple rotor types, thus effecting a large saving of power, as is well known in the art of vertical lift aircraft.

Most other known methods of torque neutralization unavoidably lead to considerable power loss. When a comparison is made with any of the hitherto constructed or proposed types of helicopter, therefore, it is found in each case that the useful power reserve is considerably greater for the counter-rotor type of my present invention.

Similar considerations apply to the forward speeds that can be attained. While the drag of the counter-rotor, (even with the trailing hinge device for the vanes) is considerable, it is not so great as the additional structure drags associated with most known helicopters. If the helicopter is proportioned for high speed by the reduction of the size of the vanes, with consequent sacrifice of power at low speed, forward speeds comparable with those of any known aircraft are apparently possible. Means for varying the effective drag area of the counter-rotor vanes, such as the ones described above, may go a long way toward combining high performance at both low and high speeds in one machine.

While I have shown the various phases and features of my invention in certain specific embodiments or combinations, I am aware that my invention and the several phases or features thereof may be embodied in other forms without departing from the spirit or essential attributes thereof, and I therefore desire the present embodiments to be considered in all respects as illustrative and not restrictive, reference being had to the appended claims rather than to the foregoing description, to indicate the scope of my invention.

Having thus described the invention, what is hereby claimed as new and desired to be secured by Letters Patent is:

1. A lifting rotor including a hub, a hollow spindle extending generally radially from said hub, a variable-pitch blade pivotally attached to said hub and means for varying the pitch of said blade including, a plunger slidable in said hollow spindle, and mechanical means interconnecting said blade and said plunger for correlating the position of the plunger in the spindle with the pitch angle of the variable-pitch blade.

2. A lifting rotor including a hub, a spindle with axis generally parallel to a line through the axis of said hub, a stub pivotally mounted on said spindle, a blade attached to said stub by means including a generally upright pivot, an eccentric for causing angular displacement of said upright pivot, and means carried by said stub for rotating said eccentric.

3. A lifting rotor including a hub, a spindle fixed to said hub, a stub pivotally mounted on said spindle, a generally upright pivot pin carried by said stub, a blade attached to said pivot pin, a rotatable eccentric associated with said pivot pin, means for imparting rotation to said eccentric, said means including a pivot carried by said stub, and means for imparting a cyclic displacement to the axis of said pivot.

4. A helicopter including a lift-rotor the lift-coefficient of whose blade is greater than the drag-coefficient thereof, an anti-torque rotor having an anti-torque vane whose drag-coefficient is greater than its lift-coefficient, and means interconnecting said two rotors so as to oppose the drag-torque of the anti-torque rotor to the driving torque-reaction of the lift-rotor.

5. A helicopter including a lift-rotor the lift-coefficient of whose blade is greater than the drag-coefficient thereof, a co-axial anti-torque rotor having an anti-torque vane whose drag-coefficient is greater than its lift-coefficient, and means interconnecting said two rotors so as to oppose the drag-torque of the anti-torque rotor to the driving torque-reaction of the lift-rotor.

6. A helicopter including an articulated lift-rotor the lift-coefficient of whose blade is greater than the drag-coefficient thereof, the blades of said lift-rotor being articulated in relation to the hub thereof for relative up-and-down motion and for relative motion generally in the surface of rotation thereof, an anti-torque rotor having an anti-torque vane whose drag-coefficient is greater than its lift-coefficient, and means interconnecting said two rotors, so as to oppose the drag-torque of the anti-torque rotor to the driving torque-reaction of the lift-rotor.

7. A helicopter including a lift-rotor the lift-coefficient of whose blade is greater than the drag-coefficient thereof, an anti-torque rotor having an anti-torque vane whose drag-coefficient is greater than its lift-coefficient, and differential means interconnecting said two rotors so as to oppose the drag-torque of the anti-torque rotor to the driving torque-reaction of the lift-rotor.

8. A helicopter including a lift-rotor the lift-coefficient of whose blade is greater than the drag-coefficient thereof, an anti-torque rotor having an anti-torque vane whose drag-coefficient is greater than its lift-coefficient, a power plant for driving said lift-rotor and means interconnecting said two rotors and said power plant so as to oppose the drag-torque of the anti-torque rotor to the driving torque-reaction of the lift-rotor.

9. A helicopter including a lift-rotor with variable-pitch blades whose lift-coefficient is greater than its drag-coefficient, an anti-torque rotor having an anti-torque vane of fixed pitch whose drag-coefficient is greater than its lift-coefficient, and means interconnecting said two rotors so as to oppose the drag-torque of the anti-torque rotor to the driving torque-reaction of the lift-rotor.

10. A helicopter including a lift-rotor with variable-pitch blades whose lift-coefficient is greater than its drag-coefficient, an anti-torque rotor having an anti-torque vane of fixed pitch whose drag-coefficient is greater than its lift-coefficient, means interconnecting said two rotors so as to oppose the drag-torque of the anti-torque rotor to the driving torque-reaction of the lift-rotor, and means for cyclically varying the pitch of the blades of the lift-rotor.

11. A helicopter including a lift-rotor having a constant blade-area, the lift-coefficient of whose blade is greater than the drag-coefficient thereof, an anti-torque rotor having an anti-torque vane having a variable vane-area and whose drag-coefficient is greater than its lift-coefficient, and means interconnecting said two rotors so as to oppose the drag-torque of the anti-torque rotor to the driving torque-reaction of the lift-rotor.

12. A helicopter including a lift-rotor, the lift-coefficient of whose blade is greater than the drag-coefficient thereof, an anti-torque rotor having an anti-torque vane whose drag-coefficient is greater than its lift-coefficient, a fuselage attached to the rotors, a power plant in said fuselage, differential means interconnecting said two rotors in said power plant so as to oppose the drag-torque of the anti-torque rotor to the driving torque-reaction of the lift-rotor, and means for turning said fuselage and for controlling the direction of pointing said fuselage.

13. A helicopter including a lift-rotor, the lift-coefficient of whose blade is greater than the drag-coefficient thereof, an anti-torque rotor having an anti-torque vane whose drag-coefficient is greater than its lift-coefficient, a fuselage attached to the rotors, a power plant in said fuselage, differential means interconnecting said two rotors in said power plant so as to oppose the drag-torque of the anti-torque rotor to the driving torque-reaction of the lift-rotor, and means for variable frictional engagement between said fuselage and said anti-torque rotor, variable at the will of the operator.

14. A helicopter including a lift-rotor having a constant blade-area, the lift-coefficient of whose blade is greater than the drag-coefficient thereof, an anti-torque rotor having an anti-torque vane having a variable vane-area and whose drag-coefficient is greater than its lift-coefficient, hinge means associated with the vane of said anti-torque rotor for permitting variation of its effective drag-area, and means interconnecting said two rotors so as to oppose the drag-torque of the anti-torque rotor to the driving torque-reaction of the lift-rotor.

15. A helicopter including a lifting rotor, a counter-rotor, drag vanes on said counter-rotor, and means operated by relative air-flow past the helicopter for varying the effective drag area of said drag vanes.

16. A helicopter including a lifting rotor, a counter-rotor, drag vanes on said counter-rotor, and means operated by relative air-flow past the helicopter for reducing the effective drag area of said drag vanes when moving in a direction opposite to that of the helicopter.

17. A helicopter including a lifting rotor, a counter-rotor, drag vanes on said counter-rotor, and means operated by relative air-flow past the helicopter for reducing the drag area of said drag vanes when the helicopter is flying at high speed.

18. A helicopter including a lifting rotor, a counter-rotor, drag vanes on said counter-rotor, each of said drag vanes comprising a plurality of relatively displaceable parts, at least one of which is displaceable by air pressure thereon caused by the relative air-flow past the helicopter.

19. A lifting rotor including a hub and blades, a plurality of spindles carried by and extending from said hub in a plane generally perpendicular to the axis of said hub with each of said spindles having its axis offset relative to the hub axis, a blade-carrying link pivotally attached to each of said spindles for imparting up-and-down flapping displacements to the corresponding blades carried thereby, and means pivotally attaching each blade to one of said blade-carrying links along a more or less upright axis of pivotation whereby each of said blades may have to-and-fro lagging displacements.

20. A lifting rotor including a hub, blades attached to said hub, pivotal means allowing freedom of swinging to said blades, hydraulic means for rotating said blades generally about their respective longitudinal axes into any selected setting within the range of movement of said blades, said setting being adjustable at the will of the operator, and for thereafter holding said blades in their new setting, and means for cyclically increasing and decreasing the pitch of each blade in respect to the mean blade setting determined by said hydraulic means, and for varying the azimuth of said cyclic pitch variation at the will of the operator.

21. A lifting rotor including a hub, a stub attached to said hub by generally horizontal pivot means, a blade attached to said stub by generally upright pivot means, means for permitting rotation of said blade generally about its longitudinal axis, hydraulic means for rotating said blade generally about its longitudinal axis into any selected setting within the range of movement of said blade, said setting being adjustable at the will of the operator, and for thereafter holding said blade in its new setting, and means for cyclically increasing and decreasing the pitch of each blade in respect to the mean blade setting determined by said hydraulic means, and for varying the azimuth of said cyclic pitch variation at the will of the operator.

22. A lifting rotor including a hub and blades, means universally articulating the blades to said hub and including means for pitch change, hydraulic means for controlling pitch change, and means for successively imparting a change of pitch to each of said blades as they pass through a pre-selected zone of their path of revolution, including means for changing the angularity of the blade-pivot relative to the hub axis.

HAVILAND H. PLATT.